United States Patent
Dyllick-Brenzinger et al.

(10) Patent No.: US 6,864,292 B1
(45) Date of Patent: Mar. 8, 2005

(54) DEFOAMER AND/OR DEAREATOR ON THE BASIS OF OIL-IN-WATER DISPERSIONS

(75) Inventors: Rainer Dyllick-Brenzinger, Weinheim (DE); Erhard Guenther, Hassloch (DE); Primoz Lorencak, Ludwigshafen (DE); Günther Glas, Meckenheim (DE); Johann Bonn, Hessheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/869,324

(22) PCT Filed: Jan. 25, 2000

(86) PCT No.: PCT/EP00/00535

§ 371 (c)(1),
(2), (4) Date: Jul. 24, 2001

(87) PCT Pub. No.: WO00/44470

PCT Pub. Date: Aug. 3, 2000

(30) Foreign Application Priority Data

Jan. 29, 1999 (DE) .......................... 199 03 546

(51) Int. Cl.$^7$ ............................ B01F 3/08; B01D 19/04; D21H 21/12
(52) U.S. Cl. ............................ 516/74; 516/72; 516/73; 516/132; 516/133; 162/158; 162/179
(58) Field of Search ................................. 516/132, 133, 516/72, 73, 74; 568/55, 75; 554/101; 162/158, 179

(56) References Cited

U.S. PATENT DOCUMENTS

| | | | | |
|---|---|---|---|---|
| 3,729,518 A | * | 4/1973 | Lepper et al. | 568/46 |
| 3,819,718 A | * | 6/1974 | Okumra et al. | 568/46 |
| 4,102,932 A | * | 7/1978 | Onopchenko et al. | 568/45 |
| 4,664,844 A | | 5/1987 | Bergold et al. | 516/132 |
| 5,118,857 A | * | 6/1992 | Aegerter et al. | 568/55 |
| 5,326,499 A | * | 7/1994 | Wegner et al. | 516/133 |
| 5,679,286 A | * | 10/1997 | Wollenweber | 516/132 |
| 5,700,351 A | * | 12/1997 | Schuhmacher et al. | 162/179 |
| 5,744,066 A | * | 4/1998 | Oppenlander et al. | 516/132 |

FOREIGN PATENT DOCUMENTS

| | | | |
|---|---|---|---|
| DE | 2 228 217 | | 12/1972 |
| DE | 21 54 318 | * | 5/1973 |
| DE | 28 51 832 | | 6/1980 |
| DE | 30 01 387 | | 7/1981 |
| DE | 196 41 076 | | 4/1998 |
| DE | 198 35 968 | | 2/2000 |
| EP | 0 149 812 | | 7/1985 |
| EP | 0 531 713 | | 3/1993 |
| EP | 0 662 172 | | 7/1995 |
| EP | 0 732 134 | | 9/1996 |
| EP | 0 696 224 | | 3/1997 |
| GB | 1174158 | * | 12/1969 |
| WO | WO 91/08034 | | 6/1991 |
| WO | WO 00/08254 | | 2/2000 |

OTHER PUBLICATIONS

English Language Translation of DE 28 51 832, Washington, DC (Dec. 2003), pages Title; 1–16, 1, 1–2 (2 total pages).*
Derwent Abstract on EAST, week 198026; London: Derwent Publications Ltd., AN 1980–45188C, DE 28 51 832 A, (HENKEL), abstract.*
Derwent Abstract on EAST, week 197321, London: Derwent Publications Ltd., AN 19730–28908U, DE 21 54 318 A, (HENKEL), abstract.*

* cited by examiner

*Primary Examiner*—Daniel S. Metzmaier
(74) *Attorney, Agent, or Firm*—Oblon, Spivak, McClelland, Maier & Neustadt, P.C.

(57) ABSTRACT

Antifoams and/or deaeraters based on oil-in-water dispersions contain, in the hydrophobic oil phase, 3-thiaalkan-1-ols, 3-thiaoxoalkan-1-ols, 3-thiadioxoalkan-1-ols, esters of said compounds or mixtures thereof as compounds having an antifoam and/or deaerating effect, and 3-thiaalkan-1-ols, 3-thiaoxoalkan-1-ols, 3-thiadioxoalkan-1-ols, esters of said compounds or mixtures thereof are used as antifoams and/or deaeraters.

24 Claims, No Drawings

DEFOAMER AND/OR DEAREATOR ON THE BASIS OF OIL-IN-WATER DISPERSIONS

BACKGROUND OF THE INVENTION

1. Field of the Invention

The present invention relates to antifoams and/or deaeraters based on oil-in-water dispersions, which contain, in the hydrophobic oil phase, at least one compound effective as an antifoam and/or deaerater and, if required, further components.

2. Description of the Background

EP-A-0 149 812 discloses antifoams based on oil-in-water emulsions, which contain from 0.05 to 5% by weight of a high molecular weight, water-soluble homo or copolymer of acrylic acid, methacrylic acid, acrylamide or methacrylamide as a stabilizer. The oil phase of the emulsions contains, for example, as antifoam compounds, a $C_{12}$–$C_{26}$-alcohol, distillation residues which are obtained in the preparation of alcohols having a relatively large number of carbon atoms by oxosynthesis or by the Ziegler process and which may furthermore be alkoxylated. Further antifoam substances are, for example, fatty esters of $C_{12}$–$C_{22}$-carboxylic acids with a monohydric to trihydric $C_1$- to $C_{18}$-alcohol and/or hydrocarbons having a boiling point above 200° C. or fatty acids of 12 to 22 carbon atoms. The mean particle diameter of the oil phase of the oil-in-water emulsions is from 0.5 to 15 μm.

DE-A-30 01 387 discloses aqueous emulsifier-containing oil-in-water emulsions which contain aliphatic alcohols having a relatively high melting point and hydrocarbons which are liquid at room temperature. The oil phase of the oil-in-water emulsions can, if required, contain further components acting as antifoams, for example nonaromatic hydrocarbons, fatty acids or derivatives thereof having a relatively high melting point, for example fatty esters, bees' wax, carnauba wax, Japan wax and montan wax.

EP-A-0 531 713 discloses antifoams based on oil-in-water emulsions whose oil phase contains an alcohol of at least 12 carbon atoms, fatty esters of alcohols of at least 22 carbon atoms and $C_1$- to $C_{36}$-carboxylic acids, or fatty esters of $C_{12}$- to $C_{22}$-carboxylic acids with monohydric to trihydric $C_1$- to $C_{18}$-alcohols or a hydrocarbon having a boiling point above 200° C. or fatty acids of 12 to 22 carbon atoms in combination with polyglyceryl esters, which are obtainable by at least 20% esterification of the polyglycerol mixtures with at least one fatty acid of 12 to 36 carbon atoms. These oil-in-water emulsions, too, are stabilized with the aid of a water-soluble emulsifier.

EP-A-0 662 172 discloses antifoams based on oil-in-water emulsions, which are used as antifoams, for example in paper mills, and a re still sufficiently effective even at relatively high temperatures of the water circulations. Such antifoams contain, in the oil phase, (a) fatty esters of $C_{12}$- to $C_{22}$-carboxylic acids with monohydric to trihydric $C_1$- to $C_{22}$-alcohol s,
(b) polyglyceryl esters which are obtainable by at least 20% esterification of polyglycerols which have at least 2 glycerol units with at least one $C_{12}$- to $C_{36}$-fatty acid and
(c) fatty esters of $C_{12}$- to $C_{22}$-carboxylic acids and polyalkylene glycols, the molar mass of the polyalkylene glycols being up to 5000 g/mol. The hydrophobic phase can, if required, contain further components, such as alcohols of at least 12 carbon atoms or hydrocarbons having a melting point above 200° C. These oil-in-water emulsions are likewise stabilized with the aid of an emulsifier.

EP-A-0 696 224 discloses aqueous antifoam dispersions whose dispersed phase contains fatty alcohols having melting points above 40° C. and ketones having melting points above 45° C. and, if required, natural or synthetic waxes having melting points above 50° C.

EP-A-0 732 134 discloses antifoams and/or deaeraters based on oil-in-water emulsions for aqueous media which have a tendency to foam formation, the oil phase of the emulsions containing (a) at least one alcohol of at least 12 carbon atoms, distillation residues which are obtainable in the preparation of alcohols having a relatively large number of carbon atoms by oxosynthesis or by the Ziegler process or mixtures of said compounds and
(b) at least one ester of a sugar alcohol having at least 4 OH groups or at least 2 OH groups and at least one intramolecular ether bond and of a fatty acid of at least 20 carbon atoms in a molar ratio of 1 to at least 1, the free OH groups of this ether being completely or partially esterified, if required, with $C_{12}$- to $C_{18}$-carboxylic acids.

The hydrophobic phase can, if required, contain further antifoam compounds, such as fatty esters of alcohols of at least 22 carbon atoms and $C_1$- to $C_{36}$-carboxylic acids, polyethylene w axes, natural waxes, hydrocarbons having a boiling point above 200° C. or fatty acids of 12 to 22 carbon atoms.

The non-prior-published DE-A-19835968.3 discloses antifoams and/or deaeraters which are based on oil-in-water dispersions and contain, in the hydrophobic oil phase, at least one compound effective as an antifoam and/or deaerater and, if required, further components and which are stabilized with the aid of from 0.01 to 3% by weight, based on the oil phase, of a water-soluble, amphiphilic copolymer having acid groups or of a water-soluble salt thereof. DE-A-19641076 discloses antifoams which are used both as oil antifoams and in the form of an emulsion antifoam in the paper industry. The oil phase of the antifoams contains, as active components, reaction products which are obtainable, for example, by reacting mono- or diglycerides with dicarboxylic acids and/or their methyl and/or ethyl esters.

It was an object of the present invention to provide novel antifoams and/or deaeraters based on oil-in-water dispersions.

SUMMARY OF THE INVENTION

We have found that this object is achieved, according to the invention, by antifoams and/or deaeraters based on oil-in-water dispersions which contain, in the dispersed hydrophobic phase, at least one compound effective as an antifoam and/or deaerater and, if required, further components, if the oil phase contains 3-thiaalkan-1-ols, 3-thiaoxoalkan-1-ols, 3-thiadioxoalkan-1-ols, esters of said compounds or mixtures thereof as compounds having an antifoam and/or deaerating effect.

The present invention furthermore relates to the use of 3-thiaalkan-1-ols, 3-thiaoxoalkan-1-ols, 3-thiadioxoalkan-1-ols, esters of said compounds or mixtures thereof as components having an antifoam and/or deaerating effect in antifoams and/or deaeraters based on oil-in-water dispersions.

DETAILED DESCRIPTION OF THE INVENTION 3-thiaalkan-1-ols are obtained by reacting α-olefins with mercapto alcohols. The addition of the thiol function of the mercapto alcohols is effected in the presence of oxygen or compounds which, under the reaction conditions (e.g. from 80 to 120° ° C.), form free radicals such as peroxides, hydroperoxides or azo compounds, such as azobisisobutyronitrile. The addition reaction of the thioether fatty alcohols with α-olefin takes place by a free radical route with anti-Markovnikov orientation, cf. Angew. Chem. 82 (1970), 276–290, according to the following scheme.

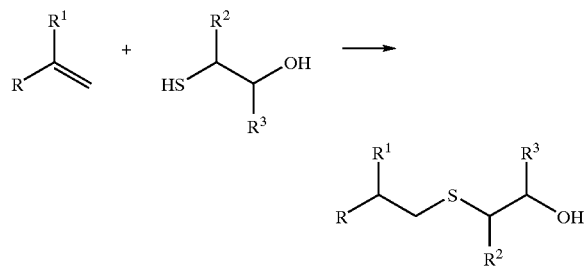

where

R is $C_8$- to $C_{30}$-alkyl, $R^1$ is H, $C_1$- to $C_5$-alkyl, preferably $CH_3$, or phenyl and $R^2$ and $R^3$ are each H, $CH_3$, $C_2H_5$ or phenyl.

The reaction products, described in the literature, of α-olefins with mercaptoethanol are used, for example, for the preparation of surfactants (cf. U.S. Pat. No. 4,040,781) or in hydraulic liquids (cf. U.S. Pat. No. 4,031,023). The corresponding 3-thiaoxoalkan-1-ols are obtained from the 3-thiaalkan-1-ols, for example, by oxidation with hydrogen peroxide, $PhICl_2$, $NaIO_4$, tert-BuOCl, potassium permanganate, tungstic acids or per acids (e.g. peracetic acid or perbenzoic acid).

3-Thiadioxoalkan-1-ols are likewise obtainable from the 3-thiaalkan-1-ols by oxidation with said oxidizing agents, except that different reaction conditions are employed, for example the concentration of the oxidizing agent and the temperature at which the oxidation is carried out are increased.

The corresponding esters are obtained from the 3-thiaalkan-1-ols, the 3-thiaoxoalkan-1-ols and the 3-thiadioxoalkan-1-ols by esterification with acids. For example, it is possible to prepare esters of phosphoric acid, sulfuric acid or carbonic acid as well as esters of organic acids, for example esters of the thia compounds with $C_1$- to $C_{30}$-carboxylic acids, phosphonic acids or sulfonic acids. In addition to monocarboxylic acids, di- and polycarboxylic acids, such as adipic acid, tartaric acid and citric acid, are also suitable. Particularly preferred components for the novel antifoams are $C_{16}$- to $C_{24}$-carboxylic acids, such as palmitic acid, oleic acid, stearic acid and behenic acid.

3-Thiaalkan-1-ols, 3-thiaoxoalkan-1-ols, 3-thiadioxoalkan-1-ols, esters of said compounds or mixtures thereof, either alone or in combination with known compounds effective as antifoams and/or deaeraters, can form the hydrophobic phase of antifoams and/or deaeraters. The hydrophobic phase of novel antifoams and/or deaeraters may contain, for example, the following components:

(a) 3-thiaalkan-1-ols, 3-thiaoxoalkan-1-ols, 3-thiadioxoalkan-1-ols, esters of said compounds or mixtures thereof and (b) at least one compound from the group consisting of the glyceryl esters of fatty acids having at least 10 carbon atoms in the molecule, $C_{12}$- to $C_{30}$-alcohol s, alkoxylated alcohols, esters of sugar alcohols having at least 4 OH groups or at least 2 OH groups and at least one intramolecular ether bond and of a fatty acid having at least carbon atoms in the molecule, fatty esters of $C_{12}$- to $C_{22}$-carboxylic acids with monohydric to trihydric alcohols, ketones having melting points above 45° C., the polyglyceryl esters which are obtainable by at least 20% esterification of polyglycerols which have at least 2 glycerol units with at least one $C_{12}$- to $C_{36}$-fatty acid, reaction products of mono- and diglycerides with dicarboxylic acids, reaction products of glycerol with dicarboxylic acids, which reaction products are esterified with at least one $C_{12}$- to $C_{36}$-fatty acid, polyethylene waxes, natural waxes, hydrocarbons having boiling points above 200° C., finely divided inert solids and mixtures of said compounds.

Preferred antifoams and/or deaeraters are those whose oil phase contains (a) 3-thiaalkan-1-ols, 3-thiaoxoalkan-1-ols, 3-thiadioxoalkan-1-ols, carboxylic esters of said compounds or mixtures thereof, (b1) polyglyceryl esters which are obtainable by at least 20% esterification of polyglycerols which have at least 2 glycerol units with at least one $C_{12}$- to $C_{36}$-fatty acid and (b2) glyceryl esters of fatty acids having at least 10 carbon atoms in the molecule, $C_{12}$- to $C_{30}$-alcohol s, alkoxylated alcohols, esters of sugar alcohols having at least 4 OH groups or at least 2 OH groups and at least one intramolecular ether bond and of a fatty acid having at least 20 carbon atoms in the molecule, fatty esters of $C_{12}$- to $C_{22}$-carboxylic acids with monohydric to trihydric alcohols, ketones having melting points above 45° C., reaction products of mono- and diglycerides with dicarboxylic acids, reaction products of glycerol with dicarboxylic acids, which reaction products are esterified with at least one $C_{12}$- to $C_{36}$-fatty acid, polyethylene waxes, natural waxes, hydrocarbons having boiling points above 200° C., finely divided inert solids and mixtures of said compounds.

The hydrophobic phase of the antifoams and/or deaeraters contains, as component (a), for example, from 1 to 100% by weight of a 3-thiaalkan-1-ol, of a 3-thiaoxoalkan-1-ol, of a 3-thiadioxoalkan-1-ol, of an ester of said compounds or of mixtures thereof. The hydrophobic phase of the antifoams and/or deaeraters preferably contains from 5 to 75% by weight of a 3-thia-$C_{16}$- to $C_{30}$-alkan-1-ol, of a 3-thiaoxo-$C_{16}$- to $C_{30}$-alkan-1-ol, of a 3-thiadioxo-$C_{16}$- to $C_{30}$-alkan-1-ol or of mixtures thereof. Particularly preferred antifoams and/or deaeraters are those whose hydrophobic phase contains from 5 to 85% by weight of a 3-thia-$C_{18}$- to $C_{28}$-alkan-1-ol. The compounds of component (b) account for from 25 to 95, preferably from 30 to 95, % by weight of the oil phase. In the case of the preferred antifoams, the amount of component (b1) is from 2 to 20% by weight and that of component (b2) is from 13 to 75% by weight.

The component (b) of the antifoams and/or deaeraters comprises all compounds which are known as antifoams and/or deaeraters. Examples of these are glyceryl esters of fatty acids having at least 10 carbon atoms in the molecule. Further suitable compounds are $C_{12}$- to $C_{30}$-alcohols, such as myristyl alcohol, cetyl alcohol, stearyl alcohol, palmityl alcohol, tallow fatty alcohol and behenyl alcohol, and synthetic alcohols, for example saturated, straight-chain, unbranched alcohols obtainable by oxidation of alkylaluminums by the Ziegler process. Synthetic alcohols are also obtained by oxosynthesis. These are as a rule alcohol mixtures. The alcohols may contain, for example, up to 48 carbon atoms in the molecule. Very effective antifoams contain, for example, mixtures of at least one $C_{12}$- to $C_{26}$-alcohol and at least one fatty alcohol having 28 to 48 carbon atoms in the molecule, cf. EP-A-0 322 830. Instead of the pure alcohols, distillation residues which are obtainable in the preparation of alcohols having a relatively large number of carbon atoms by oxosynthesis or by the Ziegler process can also be used as antifoam compounds. Further compounds which are suitable as antifoams and/or deaeraters are alkoxylated alcohols and alkoxylated distillation residues which are obtained in the preparation of alcohols by oxosynthesis or by the Ziegler process. The alkoxylated compounds are obtainable by reacting the long-chain alcohols or distillation residues with ethylene oxide or with propylene oxide or with a mixture of ethylene oxide and propylene oxide. It is possible to subject first ethylene oxide and then propylene-oxide to an addition reaction with the alcohols or the distillation residues, or first propylene oxide and then ethylene oxide. In general, up to 5 moles of ethylene oxide or propylene oxide are added per OH group of the alcohol. Particularly preferred from the group consisting of the alkoxylated compounds are those reaction products which are prepared by subjecting one or two moles of ethylene oxide to an addition reaction with one mole of fatty alcohol or distillation residue.

The abovementioned fatty alcohols having at least 12 carbon atoms in the molecule are generally used together with other compounds likewise acting as antifoams. Such compounds are, for example, fatty esters of $C_{12}$- to $C_{22}$-carboxylic acids with monohydric to trihydric $C_1$–$C_{18}$-alcohol s. The fatty acids on which these esters are based are, for example, lauric acid, myristic acid, palmitic acid, stearic acid, arachidic acid and behenic acid. Palmitic acid or stearic acid is preferably used. Monohydric $C_1$- to $C_{18}$-alcohols can be used for esterifying said carboxylic acids, e.g. methanol, ethanol, propanol, butanol, hexanol, dodecanol and stearyl alcohol, or dihydric alcohols such as ethylene glycol, or trihydric alcohols, e.g. glycerol. The polyhydric alcohols may be completely or only partially esterified.

Further compounds having an antifoam and deaerating effect are polyglyceryl esters. Such esters are prepared, for example, by esterifying polyglycerols which contain at least 2 glycerol units with at least one $C_{12}$- to $C_{36}$-carboxylic acid. The polyglycerols on which the esters are based are esterified to such an extent that compounds which are virtually insoluble in water form. The polyglycerols are obtained, for example, by condensation of glycerol under alkaline catalysis at relatively high temperatures or by reacting epichlorohydrin with glycerol in the presence of acidic catalysts. The polyglycerols usually contain from at least 2 to about 30, preferably from 2 to 12, glycerol units. Commercial polyglycerols contain mixtures of polymeric glycerols, for example mixtures of diglycerol, triglycerol, tetraglycerol, pentaglycerol and hexaglycerol and possibly polyglycerols having a higher degree of concentration. The degree of esterification of the OH groups of the polyglycerols is from at least 20 to 100, preferably from 60 to 100, %. The long-chain fatty acids used for the esterification may be saturated or ethylenically unsaturated. Suitable fatty acids are, for example, lauric acid, myristic acid, palmitic acid, stearic acid, arachidic acid, behenic acid, oleic acid, hexadecanoic acids, elaidic acid, eicosenoic acids, docosenoic acids, such as erucic acid, or polyunsaturated acids, such as octadecadienoic acids and octadecatrienoic acids, e.g. linoleic acid and linolenic acid, and mixtures of said carboxylic acids. Polyglyceryl esters suitable as antifoams are described, for example, in EP-A-0 662 172.

Other compounds which are suitable as antifoams and/or deaeraters for aqueous media having a tendency to foam formation and which are used either alone or together with at least one alcohol of at least 12 carbon atoms are esters of a sugar alcohol having at least 4 OH groups or at least 2 OH groups and at least one intramolecular ether bond and of a fatty acid having at least 20 carbon atoms in the molecule in a molar ratio of 1 to at least 1, where the free OH groups of these esters may be partially or completely esterified with $C_{12}$- to $C_{18}$-carboxylic acids. Esters of tetritols, pentitols and/or hexitols with fatty acids of at least 22 carbon atoms in a molar ratio of 1 to at least 1.9 are preferably used. Esters of mannitol and/or sorbitol with behenic acid in a molar ratio of 1 to at least 1, preferably 1 to at least 1.9, are particularly preferably employed. In addition to the suitable sugar alcohols sorbitol and mannitol, adonitol, arabitol, xylitol, dulcitol, pentaerythritol, sorbitan and erythritol are useful. Sugar alcohols are understood as meaning the polyhydroxy compounds which are formed from monosaccharides by reduction of the carbonyl function and are not themselves sugars. The anhydro compounds which form from sugar alcohols by intramolecular water elimination may also be used. Particularly effective antifoams and/or deaeraters are obtained if sugar alcohols are esterified with $C_{22}$- to $C_{30}$-fatty acids. If the sugar alcohols are only partially esterified with a fatty acid of at least 20 carbon atoms, the unesterified OH groups of the sugar alcohol can be esterified with another carboxylic acid, for example a $C_{12}$- to $C_{18}$-carboxylic acid can be used. Esters of this type are described in EP A-0 732 134.

Further compounds suitable as antifoams and/or deaeraters are ketones having melting points above 45° C. They are generally used together with fatty alcohols whose melting points are above 40° C. Such antifoam mixtures are known from EP A-0 696 224, mentioned in connection with the prior art. The reaction products, disclosed in DE-A 196 41 076, of, for example, mono- and/or diglycerides with dicarboxylic acids and reaction products of glycerol with dicarboxylic acids, which reaction products have been esterified with at least one $C_{12}$- to $C_{36}$-fatty acid, are also suitable as additives to the hydrophobic phase of the novel antifoams and/or deaeraters.

Other compounds which enhance the efficiency of long-chain alcohols as antifoams and are therefore also used in antifoam mixtures are, for example, polyethylene waxes having a molar mass of at least 2000 and natural waxes, such as bees' wax or carnauba wax.

A further component of antifoam mixtures comprises hydrocarbons having a boiling point above 200° C. (determined at atmospheric pressure). Preferably used hydrocarbons are liquid paraffins, for example the commercially available paraffin mixtures which are also referred to as white oil. Paraffins whose melting point is, for example, above 50° C. are also suitable.

The abovementioned compounds which are effective as antifoams and/or deaeraters are used either alone or as a mixture with one another for the preparation of antifoam and deaerater dispersions. They can be mixed with one another in any desired ratio. The mixing of the compounds and also the emulsification in water are effected at relatively high temperatures. The effective components which form the oil phase of the antifoam mixture are, for example, heated to above 40° C., for example from 70 to 120° C., and are emulsified in water under the action of shearing forces so that oil-in-water emulsions are obtained. Commercial apparatuses are used for this purpose. The particle size of the A dispersed hydrophobic phase is, for example, generally from 0.4 to 15 $\mu$m and from 0.2 to 40 $\mu$m, preferably from 0.5 to 5 $\mu$m. The finely divided oil-in-water emulsions thus obtained are stabilized, for example, with water-soluble, amphiphilic copolymers having acid groups or with water-soluble salts thereof. The procedure which may be used here is, for example, to add from 0.01 to 3% by weight, based on the total emulsion, of a water-soluble amphiphilic copolymer having acid groups or of a water-soluble salt thereof to the oil-in-water emulsion directly after the homogenization or to emulsify the compounds acting as antifoams and/or deaeraters in an aqueous solution of a water-soluble, amphiphilic copolymer having acid groups or of a salt thereof. Dispersions having a long shelf life are obtained in this manner after cooling to room temperature. The organic phase dispersed in water accounts for, for example, from 5 to 50, preferably from 10 to 35, % by weight of the oil-in-water dispersions.

After cooling to room temperature, the oil phase dispersed in water becomes solid so that dispersions which have a long shelf life are obtained.

The novel oil-in-water dispersions can, if required, contain finely divided, virtually water-insoluble, inert solids having particle sizes of <20 μm preferably from 0.1 to 10 μm, in an amount of, for example, from 0.1 to 50, preferably from 1 to 35, % of the weight of the oil phase of the oil-in-water dispersions. Suitable inert solids are, for example, kaolin, chalk, bentonite, talc, barium sulfate, silica, urea/formaldehyde pigments, melamine/formaldehyde pigments and microcrystalline cellulose. The use of such solids in antifoams is disclosed in DE-A-36 01 929.

Antifoam dispersions which contain from 0.01 of 3% by weight of a water-soluble, amphiphilic copolymer having acid groups or of a salt thereof are particularly advantageous.

Further advantageous antifoam dispersions contain, as a stabilizer, from 0.1 to 3% by weight, based on the oil-in-water dispersions, of at least one
polymer of monoethylenically unsaturated acids having molar masses of from 1500 to 300,000,
graft polymer of from 5 to 40 parts by weight of N-vinylformamide per 100 parts by weight of a polyalkylene glycol having a molar mass of from 500 to 10,000,
zwitterionic polyalkylenepolyamine,
zwitterionic polyethyleneimine,
zwitterionic polyetherpolyamine or
zwitterionic crosslinked polyalkylenepolyamine.

Antifoams and/or deaeraters which contain, as a stabilizer, homopolymers of acrylic acid, homopolymers of methacrylic acid, copolymers of acrylic acid and methacrylic acid, copolymers of acrylic acid and maleic acid, copolymers of methacrylic acid and maleic acid, polyvinylsulfonic acid, polyacrylamido-2-methylpropanesulfonic acid or their alkali metal and ammonium salts having molar masses of from 1500 to 300,000 are preferred.

The invention also relates to the use of
polymers of monoethylenically unsaturated acids having molar masses of from 1500 to 300,000,
graft polymers of from 5 to 40 parts by weight of n-vinylformamide per 100 parts by weight of a polyalkylene glycol having a molar mass of from 500 to 10,000,
zwitterionic polyalkylenepolyamines,
zwitterionic polyethyleneimines,
zwitterionic polyetherpolyamines or
zwitterionic crosslinked polyalkylenepolyamines
as a stabilizer of antifoams and/or deaeraters based on oil-in-water emulsions which contain, in the oil phase, 3-thiaalkan-1-ols, 3-thiaoxoalkan-1-ols, 3-thiadioxoalkan-1-ols, esters of said compounds or mixtures thereof as antifoam and/or deaereating compounds.

However, the antifoam dispersions may also contain conventional nonionic, anionic, amphoteric and/or cationic emulsifiers as sole stabilizers or as coemulsifiers. They are used, for example, in amounts of from 0.01 to 3% by weight for stabilizing oil-in-water dispersions. These are, for example, conventional surfactants which are compatible with the other substances of the antifoam dispersion. The surface-active compounds used as the sole emulsifier or as the coemulsifier with an anionic amphiphilic copolymer may also be used as a mixture with one another. For example, mixtures of anionic and nonionic surfactants may be used for further stabilization of the antifoam dispersions. The surface-active compounds suitable as coemulsifier are described as a component of antifoam formulations in the publications stated in connection with the prior art. Such coemulsifiers are, for example, sodium or ammonium salts of higher fatty acids, alkoxylated alkylphenols, oxyethylated unsaturated oils, such as reaction products of 1 mole of castor oil and from 30 to 40 moles of ethylene oxide, sulfated ethoxylation products of nonylphenol or octylphenol and their sodium or ammonium salts, alkylarylsulfonates, sulfonates of naphthalene and naphthalene condensates, sulfosuccinates and adducts of ethylene oxide and/or propylene oxide with fatty alcohols, polyhydric alcohols, amines or carboxylic acids. Particularly effective coemulsifiers are sulfated alkyldiphenyl oxides, in particular bissulfated alkyldiphenyl oxides, such as bissulfated dodecyldiphenyl oxide.

The preferred antifoam dispersions are prepared, for example, by first melting the components which form the oil phase, then emulsifying them in water, adding a water-soluble, amphiphilic copolymer containing acid groups or a salt thereof or another polymeric stabilizer and, if required, at least one of the conventional coemulsifiers described above to the still hot emulsion when the emulsified oil droplets are still liquid, and cooling the oil-in-water emulsion with formation of an oil-in-water dispersion. However, said stabilizers can also be added to the antifoam dispersion after the cooling of the oil-in-water emulsion if the oil droplets have become solid.

A process variant for the preparation of antifoam dispersions having a particularly long shelf life comprises emulsifying the molten oil phase in an aqueous solution of a water-soluble, amphiphilic copolymer containing acid groups, and/or of another polymeric stabilizer, and adding at least one coemulsifier to the hot oil-in-water emulsion after the emulsification or to the antifoam dispersion after cooling to, for example, room temperature. It has been found that antifoam dispersions which also contain at least one coemulsifier in addition to the amphiphilic anionic copolymer or another polymeric stabilizer have even less tendency to thicken or cream than those antifoam dispersions which contain only an amphiphilic anionic copolymer as stabilizer. The formulations containing a coemulsifier are furthermore particularly effective antifoams and/or deaeraters. This applies in particular to those formulations which contain polyalkylene glycols.

If the polymeric stabilizers in the form of the free acid are not sufficiently water-soluble, they are used in the form of water-soluble salts; for example, the corresponding alkali metal, alkaline earth metal and ammonium salts are used. These salts are prepared, for example, by partial or complete neutralization of the free acid group of the amphiphilic copolymers with bases; for example, sodium hydroxide solution, potassium hydroxide solution, magnesium oxide, ammonia or amines, such as triethanolamine, ethanolamine, morpholine, triethylamine or butylamine, are used for the neutralization. Preferably, the acid groups of the amphiphilic copolymer are neutralized with ammonia or sodium hydroxide solution.

The amphiphilic copolymers contain units of
(a) hydrophobic monoethylenically unsaturated monomers and
(b) monoethylenically unsaturated carboxylic acids, monoethylenically unsaturated sulfonic acids, monoethylenically unsaturated phosphonic acids or mixtures thereof.

Suitable hydrophobic monoethylenically unsaturated monomers are
(a) for example, styrene, methylstyrene, ethylstyrene, acrylonitrile, methacrylonitrile, $C_2$- to $C_{18}$-olefins, esters of monoethylenically unsaturated $C_3$- to $C_5$-carboxylic acids and monohydric alcohols, vinyl alkyl ethers, vinyl esters or mixtures thereof. From this group of monomers, isobutene, diisobutene, styrene and acrylic esters, such as ethyl acrylate, isopropyl acrylate, n-butyl acrylate and sec-butyl acrylate, are preferably used.

The amphiphilic copolymers contain, as hydrophilic monomers,
(b) preferably acrylic acid, methacrylic acid, maleic acid, maleic anhydride, itaconic acid, vinylsulfonic acid, 2-acrylamidomethylpropanesulfonic acid, acrylamidopropane-3-sulfonic acid, 3-sulfopropyl acrylate, 3-sulfopropyl methacrylate, styrenesulfonic acid, vinylphosphonic acid or mixtures thereof in polymerized form.

If the amphiphilic copolymers are not sufficiently water-soluble in the form of the free acid, they are used in the form of water-soluble salts; for example, the corresponding alkali metal, alkaline earth metal and ammonium salts are used. These salts are prepared, for example, by partial or complete neutralization of the free acid groups of the amphiphilic copolymers with bases; for example, sodium hydroxide solution, potassium hydroxide solution, magnesium oxide, ammonia or amines, such as triethanolamine, ethanolamine, morpholine, triethylamine or butylamine, are used for the neutralization. Preferably, the acid groups of the amphiphilic copolymers are neutralized with ammonia or sodium hydroxide solution. The molar mass of the amphiphilic copolymers is, for example, from 1000 to 100,000, preferably from 1500 to 10,000. The acid numbers of the amphiphilic copolymers are, for example, from 50 to 500, preferably from 150 to 350, mg of KOH/g of polymer.

Particularly preferred antifoams and/or deaeraters are those which have been stabilized with amphiphilic copolymers, the copolymers containing
(a) from 95 to 45% by weight of isobutene, diisobutene, styrene or mixtures thereof and
(b) from 5 to 55% by weight of acrylic acid, methacrylic acid, maleic acid, monoesters of maleic acid or mixtures thereof as polymerized units. Particularly preferably used copolymers are those which contain
(a) from 45 to 80% by weight of styrene,
(b) from 55 to 20% by weight of acrylic acid and, if required,
(c) additionally further monomers
as polymerized units. The copolymers can, if required, contain units of monoesters of maleic acid as polymerized further monomers (c). Such copolymers are obtainable, for example, by copolymerizing copolymers of styrene, diisobutene or isobutene or mixtures thereof with maleic anhydride in the absence of water and reacting the copolymers with alcohols after the polymerization, from 5 to 50 mol % of a monohydric alcohol being used per mole of anhydride groups in the copolymer. Suitable alcohols are, for example, methanol, ethanol, n-propanol, isopropanol, n-butanol, isobutanol and tert-butanol. However, it is also possible to react the anhydride groups of the copolymers with polyhydric alcohols, such as glycol or glycerol. Here, however, the reaction is continued only until only one OH group of the polyhydric alcohol reacts with the anhydride group. If the anhydride groups of the copolymers are not all reacted with alcohols, the anhydride groups not reacted with alcohols undergo ring opening as a result of the addition of water.

Other compounds to be used as a stabilizer are, for example, commercial polymers of monoethylenically unsaturated acids and graft polymers of N-vinylformamide on polyalkylene glycols, which are described, for example, in WO-A-96/34903. If required, up to 10% of the vinylformamide units grafted on may be hydrolyzed. The amount of vinylformamide units grafted on is preferably from 20 to 40% by weight, based on polyalkylene glycol. Preferably, polyethylene glycols having molar masses of from 2000 to 10,000 are used.

The zwitterionic polyalkylenepolyamines and zwitterionic polyethyleneimines also suitable as stabilizers are disclosed, for example, in EP-B-0112592. Such compounds are obtainable, for example, by first alkoxylating a polyalkylene polyamine or polyethyleneimine, for example with ethylene oxide, propylene oxide and/or butylene oxide, and then quaternizing the alkoxylation products, for example with methyl bromide or dimethyl sulfate, and then sulfating the quaternized, alkoxylated products with chlorosulfonic acid or sulfur trioxide. The molar mass of the zwitterionic polyalkylenepolyamines is, for example, from 1000 to 9000, preferably from 1500 to 7500. The zwitterionic polyethyleneimines preferably have molar masses of from 2000 to 1700 dalton.

Zwitterionic polyetherpolyamines suitable as stabilizers are obtainable, for example, by reacting, in a first reaction stage, linear or branched polyetherpolyamines having molar masses of from 100 to 800 and containing 2 to 10 nitrogen atoms and at least two primary or secondary terminal amino groups or the reaction products of said polyetherpolyamines with up to one mole of glycidol per NH group of the polyetherpolyamines with at least one $C_2$- to $C_4$-alkylene oxide or tetrahydrofuran in an amount such that from 1 to 50 alkylene oxide units undergo addition per NH group in the polyetherpolyamines. In a second process step, the alkoxylated polyetherpolyamines are reacted with a compound selected from the group consisting of halosulfonic acids, halophosphoric acids, vinylsulfonic acid, propanesultone, haloacetic acids, acrylic acid, methacrylic acid, vinylphosphoric acid and the alkali metal or ammonium salts of said acids in a manner such that at least one terminal tertiary amino group of the alkoxylated polyetherpolyamines contains 2 groups of the formula

 (I)

 (II)

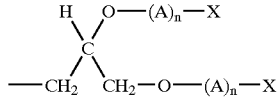

where
A is an ethylene oxide, propylene oxide, butylene oxide or tetrahydrofuran unit,
n is from 1 to 50, X is —$SO_3M$, —$CH_2$—$CH_2$—$SO_3M$, -continued —CH₂—CH₂—CH₂—SO₃M,    —CH₂—CH—CH₂—SO₃M,
                                |
                                OH

—CH₂—COOM,    —CH₂—CH₂—COOM,

—PO₃M₂,    —CH₂—CH₂—PO₃M₂, it being possible, in the formula II, for one substituent X also to be hydrogen, and M is hydrogen, an alkali metal or ammonium. At least one terminal tertiary amino group of the alkoxylated polyetherpolyamine can however also contain only one group of the formula I or II and one group of the following structures

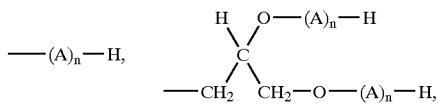

$C_1$- to $C_{22}$-alkyl or $C_7$- to $C_{22}$-aralkyl, where A and n have the same meanings as in the formulae I and II.

In a 3rd process stage, the reaction product obtained in the 2nd process stage is quaternized. The quaternization can however also be achieved by quaternizing the product obtainable in the 1st reaction stage and then carrying out the reaction stated in the 2nd reaction stage.

Of particular industrial interest as stabilizers are zwitterionic polyetherpolyamines of the formulae

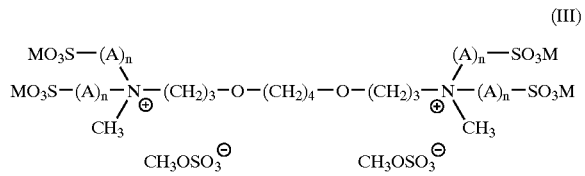

(III)

where

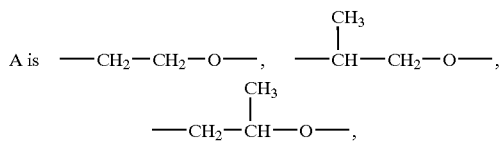

M is H, Na, K or ammonium and
n is 15–25,
and

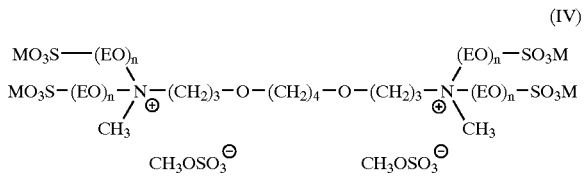

(IV)

where
EO is —CH₂—CH₂—O—
M is H, Na, K or ammonium and
n is 15–25.

The molar mass of the zwitterionic polyetherpolyamines is, for example, up to 9000, preferably from 1500 to 7500.

Zwitterionic crosslinked polyamines which are also suitable as a stabilizer for oil-in-water dispersions are obtainable, for example, by reacting aliphatic or araliphatic monoamines or polyamines having from 2 to 5 primary, secondary or tertiary nitrogen groups with a crosslinking agent, for example in a ratio of from 20:1 to 1:1, based on molar amounts of amino groups in the amines and molar amounts of reactive groups in the crosslinking agents, with formation of crosslinked polyamines having molar masses of from 150 to 1500, alkoxylating the crosslinked amines, then introducing an anionic group into the resulting product by reacting these compounds, for example with a halosulfonic acid, halophosphoric acid, vinylsulfonic acid, propanesulfonic acid, haloacetic acid, acrylic acid, methacrylic acid, vinylphosphoric acid or the alkali metal or ammonium salts of said compounds containing acid groups, and then quaternizing the products, for example with methyl bromide and dimethyl sulfate, it being possible to effect the quaternization also directly after the alkoxylation of the crosslinked polyamines. Furthermore, the polyetheramines described above may be used as polyamines. For example, suitable stabilizers can be prepared by reacting 4,9-dioxadodecane-1,12-diamine with epichlorohydrin in a molar ratio of 2:1, ethoxylating the reaction product obtainable, for example 20 mol of ethylene oxide undergoing addition per NH group, then quaternizing the reaction product with dimethyl sulfate and sulfating the quaternized product in a further reaction stage by reaction with SO₃ or chlorosulfonic acid.

Suitable stabilizers for the novel antifoams and/or deaerators are preferably homopolymers of acrylic acid, homopolymers of methacrylic acid, copolymers of acrylic acid and methacrylic acid in any desired molar ratio, copolymers of acrylic acid and maleic acid in any desired molar ratio, copolymers of methacrylic acid and maleic acid, polyvinylsulfonic acid, polyacrylamido-2-methylpropanesulfonic acid, styrenesulfonic acid and the alkali metal and ammonium salts of said polymers having molar masses of, for example, from 1500 to 300,000.

The novel antifoams and/or deaeraters are very effective in aqueous systems which tend to foam, both at room temperature and at higher temperatures, for example at above 40° C. They have substantially improved long-term effect compared with known antifoams. The aqueous dispersions are preferably used as antifoams and/or deaeraters for foam control of aqueous media having to tendency to foam formation, for example in the food industry, in the starch industry and in wastewater treatment plants. Of particular interest, however, is the use of the antifoams and/or deaeraters for foam control in pulp cooking, in pulp washing, in the beating of paper stock, in paper making and in the dispersing of pigments for paper making. In these processes, the temperature of the aqueous medium to be defoamed is generally above 40° C., for example from 45 to 75° C. The novel mixtures based on oil-in-water dispersions act both as antifoams and as deaeraters. In some cases, the deaerating effect is more pronounced than the antifoam effect. They can be used as antifoams or deaeraters. They are also advantageously used in the engine sizing and surface sizing of paper. When these mixtures are used in paper stock suspensions, for example, their deaerating effect is to the forefront. For example, up to 0.5, preferably from 0.002 to 0.3, % by weight of the deaerater are used per 100 parts by weight of paper stock in a foam-forming medium.

In the examples which follow, parts and percentages are by weight, unless stated otherwise in the examples.

EXAMPLES

The tendency of the dispersions to cream was determined using the centrifuge test. For this purpose, the dispersion was poured into a 97 mm long centrifuge tube to a height of 75 mm and centrifuged for 30 minutes at 5000 rpm. The larger the amount of water which had separated off at the bottom, the lower the stability of the dispersion. The height from the bottom of the centrifuge tube to the front of the oil phase was measured.

The deaerating effect was determined with the aid of a Sonica measuring instrument, the antifoam being added to a 0.38% strength paper stock suspension at 40° C. exactly in an amount which gave a concentration of 5 ppm, based on the oil phase (active substance), of antifoam. The air content was determined continuously by means of ultrasound attenuation before the metering of the antifoams and during the first 5 minutes after metering. The air content initially decreased and increased again toward the end of the measurement. In each case, the minimum air content of the paper stock suspension in % by volume is stated in the table. This method of measurement is described in TAPPI Journal 71 (1988), 65–69.

Said paper stock suspension was used in all examples and comparative examples. Before the addition of a deaerater, it contained 1.44% by volume of air. In the table, the air content in % by volume after metering of the deaeraters is stated under the header minimum air content. The smaller this number, the more effective is the deaerater.

The long-term effect of the antifoams or deaeraters was determined by comparing the air content of the paper stock suspension after 5 minutes with the minimum air content It (immediately after the metering of the deaerater). The value shown in the table for the long-term effect is the difference between the value for the deaerating effect after 5 minutes and the value which is measured immediately after the metering. The smaller the value, the better the long-term effect.

The antifoam activity was determined in a foam channel, likewise at 50° C., a paper stock suspension which was foamed by introduction of air being added to the antifoam. The foam protuberance was formed two-dimensionally on the vertical wall of the foam channel and counted in $cm^2$. This method is disclosed in the literature, cf. F. Poschmann, Das Papier 15, 295–301 (1961).

The stated particle sizes are mean values which were determined with the aid of a Coulter LS 230 apparatus using about 0.1% strength dispersions. The apparatus operates according to the principle of Fraunhofer diffraction.

Preparation of 3-thiaalkan-1-ols

Thiaalkanol A

In a V2A stainless steel reactor, 402 g (1.3 mol) of a $C_{20}$—/$C_{24}$-α-olefin mixture (melting point about 50° C.) were heated to 65° C. Thereafter 101.5 g (1.3 mol) of 2-mercaptoethanol were added dropwise in the course of 30 minutes and an air stream was passed continuously over the reaction mixture. The temperature of the reaction mixture increased to 84° C. during the addition of the mercaptoethanol. After the end of the addition of mercaptoethanol, the reaction mixture was stirred for a further 10 hours at 100° C. and unreacted mercaptoethanol was then distilled off. Residual volatile impurities were then removed with the aid of steam distillation. 398 g of a colorless wax having a melting point of about 65° C. were obtained.

Thiaalkanol B

In a V2A stainless steel reactor equipped with a stirrer, 309 g (1.0 mol) of a $C_{20}$-/$C_{24}$-α-olefin mixture having a melting point of about 50° C. were heated to 80° C. 70 g (0.9 mol) of 2-mercaptoethanol were added dropwise to the melt in the course of 30 minutes and at the same time an air stream was passed over the reaction mixture. The temperature increased to 84° C. After addition of the mercaptoethanol, the reaction mixture was stirred for a further 20 hours at 90° C. until the mercaptoethanol content was below 0.3%. Thereafter, the reaction mixture was cooled to 75° C. and the volatile fractions were then removed at 75 mbar. 378 g of a colorless wax having a melting point of about 65° C. were obtained.

Thiaalkanol C 309 g (1.0 mol) of a $C_{20/24}$ α-olefin mixture (melting point about 50° C.) and 70 g (0.9 mol) of mercaptoethanol were metered simultaneously into a V2A stainless steel reactor over a period of 30 minutes and at the same time an air stream was passed over the reaction mixture. The temperature increased to 95° C. After metering was complete, stirring was carried out for 20 hours at 90° C. until the mercaptoethanol content had fallen below 0.3% by weight. Thereafter, the reaction mixture was cooled to 75° C. and the volatile fractions were then removed at 75 mbar. 365 g of a colorless wax having a melting point of about 65° C. were obtained.

Thiaalkanol D

The procedure was as described in the preparation of thiaalkanol B, except that in this case 0.8 mol of 2-mercaptoethanol was used instead of 0.9 mol of 2-mercaptoethanol.

Thiaalkanol E

Preparation as described for thiaalkanol B but with the only exception that 0.95 mol of 2-mercaptoethanol was used.

Thiaalkanol F

Preparation as for thiaalkanol B, except that 0.85 mol of 2-mercaptoethanol was used.

EXAMPLE 1

An oil-in-water emulsion in which the oil phase accounted for 27.3% by weight of the dispersion and had a mean particle size of from 0.9 to 10 µm was prepared with the aid of an Ultraturrax and of a high-pressure homogenizer from APV Gaulin GmbH.

The hydrophobic phase consisted of the following components:
(a) 664 parts of the thiaalkanol B,
(b) 56 parts of a polyglyceryl ester which is obtainable by esterifying a polyglycerol mixture comprising 27% of diglycerol, 44% of triglycerol, 19% of tetraglycerol and 10% of polyglycerols having a higher degree of condensation with behenic acid (degree of esterification 100%) and
(c) 254.8 parts of glyceryl triesters of $C_{16}$- to $C_{18}$-fatty acids.

The aqueous phase consisted of:
2560 parts of demineralized water,
28 parts of a 40% strength aqueous, ammoniacal solution of an amphiphilic copolymer of 50 parts of acrylic acid and 50 parts of styrene, having an acid number of 320 mg of KOH/g of polymer and a molar mass of 5500 and 3.5 parts of a xanthan gum.

The aqueous solution was heated to 95° C.

The abovementioned components (a) to (c) were first heated to 90° C. and then emulsified in the aqueous phase heated to 95° C., with great shearing with an Ultraturrax for 2 minutes. The emulsion was divided into 3 parts which were then emulsified at 10, 20 and bar by means of a high-pressure homogenizer and in each case cooled to room temperature in an ice bath immediately after the emulsification. The properties of the dispersions thus obtained are shown in Table 1.

EXAMPLE 2

As described in Example 1, an oil-in-water dispersion was prepared in which the hydrophobic phase consisted of the following components:
(a) 92 parts of the thiaalkanol A,
(b) 8 parts of a polyglyceryl ester which is obtainable by esterifying a polyglycerol mixture comprising 27% of diglycerol, 44% of triglycerol, 19% of tetraglycerol and 10% of polyglycerols having a higher degree of condensation with a $C_{12}$- to $C_{26}$-fatty acid mixture (degree of esterification 60%) and
(c) 36.4 parts of glyceryl triesters of $C_{18}$-fatty acids.

The aqueous phase consisted of 360 parts of water, 5 parts of a 27% strength aqueous, ammoniacal solution of an amphiphilic copolymer of 25 parts of acrylic acid and 75 parts of styrene, having a molar mass of 16,000 D and an acid number of 240 mg of KOH/g of polymer.

The components (a) to (c) were mixed, first heated to 110° C., then introduced with great shearing by means of an Ultraturrax in the course of 15 seconds into an aqueous solution heated to 80° C., then emulsified for 45 seconds and, immediately after the emulsification, cooled to room temperature by means of an ice bath. The properties of the dispersion are shown in Table 1.

EXAMPLE 3

According to Example 1, an oil-in-water dispersion was prepared in which the hydrophobic phase consisted of
(a) 92 parts of the thiaalkanol D,
(b) 8 parts of a polyglyceryl ester which was prepared by esterifying a polyglycerol mixture comprising 27% of diglycerol, 44% of triglycerol, 19% of tetraglycerol and 10% of polyglycerols having a higher degree of condensation with behenic acid (degree of esterification 100%) and
(c) 36.4 parts of glyceryl triesters of $C_{16}$- to $C_{18}$-fatty acids.

The aqueous phase consisted of 360 parts of demineralized water, 4 parts of a 40% strength ammoniacal solution of an amphiphilic copolymer of 50 parts of acrylic acid and 50 parts of styrene (molar mass 5500, acid number 320 mg of KOH/g of polymer) and 0.5 part of a xanthan gum. The abovementioned components (a) to (c) were first heated to 90° C., then introduced with great shearing by means of an Ultraturrax in the course of 15 seconds into the aqueous phase heated to 95° C., then emulsified for 45 seconds and, immediately after the emulsification, cooled to room temperature in an ice bath. The properties of the dispersion are shown in Table 1.

EXAMPLE 4

With the aid of an Ultraturrax, an oil-in-water dispersion was prepared in which the oil phase accounted for 27.3% of the dispersion and had a mean particle size of from 0.9 to 10 μm. The hydrophobic phase consisted of the following components:
(a) 92 parts of the thiaalkanol E,
(b) 8 parts of a polyglyceryl ester which was prepared by esterifying a polyglycerol mixture comprising 27% of diglycerol, 44% of triglycerol, 19% of tetraglycerol and 10% of polyglycerols having a higher degree of condensation with behenic acid (degree of esterification 100%) and
(c) 36.4 parts of glyceryl esters of $C_{16}$- to $C_{18}$-fatty acids.

The aqueous phase consisted of 360 parts of demineralized water, 4 parts of a 40% strength aqueous ammoniacal solution of an amphiphilic copolymer of 50 parts of acrylic acid and 50 parts of styrene (molar mass 5500, acid number 320 mg of KOH/g of polymer) and 0.5 part of a commercial xanthan gum. The components (a) to (c) of the hydrophobic phase were mixed, heated to 90° C., then introduced with great shearing by means of an Ultraturrax in the course of 15 seconds into the aqueous phase heated to 95° C., and then emulsified for 45 seconds. The oil-in-water emulsion was cooled to room temperature in an ice bath. The properties of the dispersion thus obtained are shown in Table 1.

EXAMPLE 5

According to Example 1, an oil-in-water dispersion was prepared by emulsifying an oil phase comprising
(a) 92 parts of the thiaalkanol F,
(b) 8 parts of a polyglyceryl ester which is obtainable by esterifying a polyglycerol mixture comprising 27% of diglycerol, 44% of triglycerol, 19% of tetraglycerol and 10% of polyglycerols having a higher degree of condensation with behenic acid (degree of esterification 100%) and
(c) 36.4 parts of glyceryl triesters of $C_{16}$- to $C_{18}$-fatty acids in an aqueous phase. The aqueous phase consisted of 360 parts of demineralized water and 4 parts of a 45% strength aqueous solution of a bissulfonated dodecyldiphenyl oxide (Dowfax 2A1). The components (a) to (c) of the oil phase were mixed, heated to 90° C., then introduced with great shearing by means of an Ultraturrax in the course of 15 seconds into the aqueous phase heated to 95° C., and then emulsified for 45 seconds. Immediately after the emulsification, the mixture was cooled. The properties of the oil-in-water dispersion thus obtained are shown in Table

COMPARATIVE EXAMPLE

An oil phase comprising the following components was first prepared according to EP-A-0662172:
(a) 18 parts of a glyceryl triester of $C_{16}$- to $C_{18}$-fatty acids,
(b) 5 parts of a polyglyceryl ester which was prepared by esterifying a polyglycerol mixture comprising 27% of diglycerol, 44% of triglycerol, 19% of tetraglycerol and 10% of polyglycerols having a higher degree of condensation with a $C_{12}$- to $C_{26}$-fatty acid mixture (degree of esterification 60%) and
(c) 2 parts of a fatty ester which is obtainable by esterifying a $C_{16}$- to $C_{18}$-fatty acid mixture with a block copolymer comprising ethylene oxide and propylene oxide in a molar ratio of 3:7, having a molecular weight of 1200 g/mol.

The components (a) to (c) were mixed, first heated to 110° C. and then emulsified in an aqueous phase comprising 70 parts of demineralized water, 3 parts of an emulsifier which is obtainable by subjecting 25 mol of ethylene oxide to an addition reaction with 1 mol of isooctylphenol and esterifying the adduct with sulfuric acid to give the monoester, and 1 part of a copolymer of 70% of acrylamide and 30% of acrylic acid, having a K value of 270, and 0.2 part of sodium hydroxide solution. For this purpose, the aqueous phase was first heated to 80° C. and the hydrophobic phase was emulsified with great shearing by means of an Ultraturrax in the course of one minute. Immediately after the emulsification, the mixture was cooled to room temperature in an ice bath. The properties of the dispersion thus obtained are shown in Table 1.

EXAMPLE 6

According to Example 1, an oil-in-water dispersion was prepared in which the oil phase had the following composition:

(a) 644 parts of thiaalkanol C,
(b) 56 parts of a polyglyceryl ester which is obtainable by esterifying a polyglycerol mixture comprising 27% of diglycerol, 44% of triglycerol, 19% of tetraglycerol and 10% of polyglycerols having a higher degree of condensation with behenic acid (degree of esterification 100%) and
(c) 254.8 parts of glyceryl triesters of $C_{16}$–$C_{18}$-fatty acids.

The aqueous phase consisted of:

mg of KOH/g of polymer) in the course of 20 seconds and emulsifying said aqueous phase for 30 seconds. The pre-emulsion thus prepared was then homogenized twice at 85° C. in a colloid mill with a gap setting of 1 μm and immediately cooled to 25° C. by means of ice, so that a finely divided dispersion of the components of the hydrophobic phase in water was obtained (mean particle diameter 2.6 μm).

TABLE 1

| Example | Pressure during the homogenization [bar] | Particle size of the O/W dispersions [μm] | Viscosity of the O/W dispersions [mPas][2] | Shelf life of the O/W dispersions at 30° C./+5° C. in the course of one month | Minimum air content [% by volume] | Long-term effect (5 min) [% by volume] | Tendency to cream according to centrifuge test, 5000 rpm [mm] |
|---|---|---|---|---|---|---|---|
| 1a) | 10 | 3.0 | 100 | homogeneous | 0.24 | 0.17 | 8 |
| 1b) | 20 | 3.0 | 88 | " | 0.24 | 0.18 | 8 |
| 1c) | 40 | 2.1 | 70 | " | 0.23 | 0.13 | 11 |
| 2 |  | 2.9 | 20 | " | 0.26 | 0.22 | 5 |
| 3 |  | 2.2 | 240 | " | 0.25 | 0.18 |  |
| 4 |  | 2.2 | 250 | " | 0.22 | 0.13 |  |
| 5 |  | 4.1 | 65 / 61[1] | " | 0.27 | 0.14 |  |
| 6a) | 20 | 8.0 | 97 | slight separation into two serial phases | 0.26 | 0.09 |  |
| 6b) | 40 | 8.7 | 160 | slight separation into two serial phases | 0.25 | 0.09 |  |
| 7) |  | 2.6 | 130 | homogeneous | 0.25 | 0.18 |  |
| Comparative example |  | 4.7 | 530 | creamed | 0.29 | 0.32 | 15 |

[1]after addition of 0.7 part of a bissulfonated dodecyldiphenyl oxide
[2]measured using a Brookfield viscometer at 20° C. and 100 rpm 2560 parts of demineralized water,
12 parts of a polyglyceryl ester of polyglycerol having an average molar mass of 200 and oleic acid in a molar ratio of 1:1.7 and
3.5 parts of a xanthan gum.

The aqueous solution was processed with components (a), (b) and (c) as described in Example 1 at 20 and 40 bar to give an oil-in-water dispersion.

EXAMPLE 7

An oil-in-water dispersion was prepared by initially taking a hydrophobic phase comprising
(a) 92 parts of the thiaalkanol B,
(b) 8 parts of a polyglyceryl ester which is obtainable by esterifying a polyglycerol mixture comprising 27% of diglycerol, 44% of triglycerol, 19% of tetraglycerol and 10% of polyglycerols having a higher degree of condensation with behenic acid (degree of esterification 100%),
(c) 16 parts of a hydrogenated castor oil having an iodine number of <5 and
(d) 4 parts of a finely divided kaolin in which 98% of the particles had a size of <2 μm
with vigorous stirring by means of an Ultraturrax at 85° C. and introducing the heated aqueous phase consisting of
370 parts of demineralized water and
2.5 parts of a 40% strength aqueous ammoniacal solution of an amphiphilic copolymer of 50 parts of acrylic acid and 50 parts of styrene (molar mass 5500, acid number 320

EXAMPLE 8

An oil-in-water dispersion in which the oil phase comprised 23.8% by weight of the dispersion and had a mean particle size of from 0.2 to 30 μm was prepared with the aid of a Sonotrode (ultrasonic probe of the UP 4006 type from Dr. Hielscher GmbH).

The oil phase consists of the following components:
(a) 3.15 parts of thiaalkanol B
(b) 0.22 part of a polyglyceryl ester which is obtainable by complete esterification of a polyglycerol mixture comprising 27% of diglycerol, 44% of triglycerol, 19% of tetraglycerol and 10% of polyglycerols having a higher degree of condensation with behenic acid The water phase consisted of:
10.6 parts of a 0.4% strength solution of a high molecular weight anionic polyacrylamide (molar mass>1 million) and 0.15 part of a 45% strength aqueous solution of the sodium salt of an acrylic acid homopolymer having an average molar mass of 2500.

Components (a) and (b) were first heated to 90° C. and then emulsified in the aqueous phase at 95° C. with high shearing with the Sonotrode for 1 minute and at a power of 20% and immediately cooled in an ice bath to room temperature. The properties of the dispersion thus obtainable are shown in Table 2.

EXAMPLE 9

An oil-in-water dispersion in which the oil phase comprised 23.8% of the dispersion was prepared with the aid of an Ultraturrax (colloid mill) and a high-pressure homogenizer from APV Gaulin GmbH.

The oil phase consisted of the following components:
(a) 644 parts of thiaalkanol B
(b) 56 parts of a polyglyceryl ester which is obtainable by complete esterification of a polyglycerol mixture comprising 27% of diglycerol, 44% of triglycerol, 19% of tetraglycerol and 10% of polyglycerols having higher degrees of condensation with behenic acid, and
(c) 254.8 parts of glyceryl triesters of $C_{16}$–$C_{18}$-fatty acids.

The water phase consisted of:
2454 parts of water, 77.7 parts of a 45% strength aqueous solution of the sodium salt of an acrylic acid homopolymer having an average molar mass of 2500 and 8.75 parts of a high molecular weight anionic polyacrylamide (molar mass>1 million)

Components (a) to (c) were first heated to 90° C. and then emulsified in the aqueous phase at 95° C. with high shearing by an Ultraturrax for 2 minutes. This emulsion was then further emulsified at 20, 40 and 60 bar by means of a high-pressure homogenizer from APV Gaulin GmbH and cooled with an ice bath to room temperature immediately after the emulsification. The properties of the dispersions thus obtainable are shown in in 20 Table 2.

EXAMPLE 10

An oil-in-water dispersion in which the oil phase comprised 23.8% by weight of the dispersion and had a mean particle size of from 0.6 to 8 µm was prepared with the aid of an ultrasonic probe of the UP 400 s type from Dr. Hielscher GmbB.

The oil phase consisted of the following components:
(a) 3.15 parts of thiaalkanol B
(b) 0.22 part of a polyglyceryl ester which is obtainable by 100% esterification of a polyglycerol mixture comprising 27% of diglycerol, 44% of triglycerol, 19% of tetraglycerol and 10% of polyglycerols having a higher degree of condensation with behenic acid.

The water phase consisted of:
10.6 parts of a 0.4% strength solution of a high molecular weight anionic polyacrylamide (molar mass>1 million) and 0.15 part of a 35% strength aqueous solution of an acrylic acid homopolymer having an average molar mass of 100,000. Components (a) and (b) were first heated to 90° C. and then emulsified in the aqueous phase at 95° C. with high shearing with the Sonotrode for 1 minute and at a power of 20% and immediately cooled in an ice bath to room temperature. The properties of the dispersion thus obtainable are shown in Table 2.

EXAMPLE 11

Oil-in-water dispersions in which the oil phase comprise 23.8% by weight of the dispersion were prepared with the aid of an ultrasonic probe of the UP 400 s type from Dr. Hielscher GmbH.

The oil phase consists of the following components:
(a) 3.15 parts of thiaalkanol B
(b) 0.22 part of a polyglyceryl ester which is obtainable by complete esterification of a polyglycerol mixture comprising 27% of diglycerol, 44% of triglycerol, 19% of tetraglycerol and 10% of polyglycerols having a higher degree of condensation with behenic acid.

The water phase consisted of:
10.6 parts of a 0.4% strength solution of a high molecular weight anionic polyacrylamide (molar mass>1 million), 0.03 part of a 45% strength aqueous solution of the sodium salt of an acrylic acid homopolymer having an average molar mass of 2500, and
0.12 part of a 35% strength aqueous solution of an acrylic acid homopolymer having an average molar mass of 100,000.

Components (a) and (b) were first heated to 90° C. and then emulsified in the aqueous phase at 95° C. with high shearing with the Sonotrode for ½, 1, ½ and 2 minutes and at a power of 20% and immediately cooled in an ice bath to room temperature. The properties of the dispersion thus obtainable are shown in Table 2.

EXAMPLE 12

An oil-in-water dispersion in which the oil phase comprised 23.8% by weight of the dispersion and had an average particle size of from 0.4 to 15 µm was prepared with the aid of an ultrasonic probe of the UP 400 s type from Dr. Hielscher GmbH.

The oil phase consisted of the following components:
(a) 3.15 parts of thiaalkanol B and
(b) 0.22 part of a polyglyceryl ester which was prepared by complete esterification of a polyglycerol mixture comprising 27% of diglycerol, 44% of triglycerol, 19% of tetraglycerol and 10% of polyglycerols having higher degrees of condensation with behenic acid.

The water phase consisted of:
10.6 parts of a 0.4% strength solution of a high molecular weight anionic polyacrylamide (molar mass>1 million) and 0.15 part of a 40% strength aqueous solution of the sodium salt of an acrylic acid homopolymer having an average molar mass of 30,000.

Components (a) and (b) were first heated to 90° C. and then emulsified in the aqueous phase at 95° C. with high shearing with the Sonotrode for 1 minute and at a power of 20% and immediately cooled to room temperature with an ice bath. The properties of the dispersion thus obtainable are shown in Table 2.

EXAMPLE 13

An oil-in-water dispersion in which the oil phase comprised 23.8% by weight of the dispersion and had an average particle size of from 0.6 to 10 µm was prepared with the aid of an ultrasonic probe of the UP 400 s type from Dr. Hielscher GmbH.

The oil phase consisted of the following components:
(a) 3.15 parts of thiaalkanol B and
(b) 0.22 part of a polyglyceryl ester which was prepared by complete esterification of a polyglycerol mixture comprising 27% of diglycerol, 44% of triglycerol, 19% of tetraglycerol and 10% of polyglycerols having higher degrees of condensation with behenic acid.

The water phase consisted of:
10.6 parts of a 0.4% strength solution of a high molecular weight anionic polyacrylamide (molar mass>1 million) and 0.15 part of a 35% strength aqueous solution of an acrylic acid homopolymer having an average molar mass of 250,000.

Components (a) and (b) were first heated to 90° C. and then emulsified in the aqueous phase at 95° C. with high shearing with the Sonotrode for 1 minute and at a power of 20% and immediately cooled to room temperature in an ice bath. The properties of the dispersion thus obtainable were shown in Table 2.

EXAMPLE 14

An oil-in-water dispersion in which the oil phase comprised 23.8% by weight of the dispersion and had an average particle size of from 0.4 to 10 µm was prepared with the aid of an ultrasonic probe of the UP 400 s type from Dr. Hielscher GmbH.

The oil phase consisted of the following components:
(a) 3, 15 parts of thiaalkanol B
(b) 0.22 part of a polyglyceryl ester which is obtainable by complete esterification of a polyglycerol mixture comprising 27% of diglycerol, 44% of triglycerol, 19% of tetraglycerol and 10% of polyglycerols having higher degrees of condensation with behenic acid.

The water phase consisted of:
10.6 parts of a 0.4% strength solution of a high molecular weight anionic polyacrylamide (molar mass>1 million),
0.15 part of a 35% strength aqueous solution of an acrylic acid homopolymer having an average molar mass of 100,000 and
0.75 part of a polyethylene glycol having a molar mass of 9000.

Components (a) and (b) were first heated to 90° C. and then emulsified in the aqueous phase at 95° C. with high shearing with the Sonotrode for 1 minute and at a power of 20% and immediately cooled to room temperature in an ice bath. The physical properties of the dispersion thus prepared are shown in Table 2.

TABLE 2

| Example | Duration in min/intensity in % or pressure in bar during homogenization | Particle size distribution in μm | Stability at room temperature within one month | Minimum air content in [% volume] at 50° C. |
| --- | --- | --- | --- | --- |
| 8 | 1/20 | 0.2–30 | Homogeneous | 0.26 |
| 9 a | 20 bar | | homogeneous | 0.39 |
| 9 b | 40 bar | | homogeneous | 0.27 |
| 9 c | 60 bar | | homogeneous | 0.24 |
| 10 | 1/20 | 0.6–8 | homogeneous | 0.24 |
| 11 a | 0.5/20 | 0.4–30 | homogeneous | |
| 11 b | 1/20 | 0.04–10 | homogeneous | |
| 11 c | 1.5/20 | 0.04–0.5 0.5–8 bimodal | homogeneous | |
| 11 d | 2/20 | 0.06–8 | homogeneous | |
| 12 | 1/20 | 0.4–15 | homogeneous | 0.29 |
| 13 | 1/20 | 0.6–10 | homogeneous | 0.27 |
| 14 | 1.5/20 | 0.4–10 | homogeneous | 0.25 |

| Example | Long-term effect (5 min) in [% by volume] at 50° C. | Antifoam activity in the foam channel in cm$^2$ at 50° C. | Emulsifying apparatus |
| --- | --- | --- | --- |
| 8 | 0.26 | 210 | ultrasonic |
| 9 a | 0.25 | 220 | homogenizer |
| 9 b | 0.29 | 230 | homogenizer |
| 9 c | 0.37 | 230 | homogenizer |
| 10 | 0.20 | 250 | ultrasonic |
| 11 a | | 240 | ultrasonic |
| 11 b | | 230 | ultrasonic |
| 11 c | | 230 | ultrasonic |
| 11 d | | 230 | ultrasonic |
| 12 | 0.26 | 210 | ultrasonic |
| 13 | 0.21 | 220 | ultrasonic |
| 14 | 0.13 | 170 | ultrasonic |

We claim:

1. In a method of papermaking in which an antifoam and/or a deaerator is used, the improvement comprising using as said antifoam and/or deaerator, an antifoam and/or deaerator comprising an oil-in-water dispersion which contains, in the dispersed hydrophobic phase, at least one compound effective as an antifoam and/or deaerator and, if required, further components, wherein the hydrophobic phase contains 3-thiaalkan-1-ols, 3-thiaoxoalkan-1-ols, 3-thiadioxoalkan-1-ols, esters of said compounds or mixtures thereof as compounds having an antifoam and/or deaerating effect.

2. The method as claimed in claim 1, wherein the hydrophobic phase contains
   (a) 3-thiaalkan-1-ols, 3-thiaoxoalkan-1-ols, 3-thiadioxoalkan-1-ols, esters of said compounds or mixtures thereof and
   (b) at least one compound from the group consisting of the glyceryl esters of fatty acids having at least 10 carbon atoms in the molecule, $C_{12}$- to $C_{30}$-alcohols, alkoxylated alcohols, esters of sugar alcohols having at least 4 OH groups or at least 2 OH groups and at least one intramolecular ether bond and of a fatty acid having at least 20 carbon atoms in the molecule, fatty esters of $C_{12}$- to $C_{22}$-carboxylic acids with monohydric to trihydric alcohols, ketones having melting points above 45° C., the polyglyceryl esters which are obtainable by at least 20% esterification of polyglyceryl esters which have at least 2 glycerol units with at least one $C_{12}$- to $C_{36}$ fatty acid, reaction products of mono- and diglycerides with dicarboxylic acids, reaction products of glycerol with dicarboxylic acids, which reaction products are esterified with at least one $C_{12}$- to $C_{36}$-fatty acid, polyethylene waxes, natural waxes, hydrocarbons having boiling points above 200° C., finely divided inert solids and mixtures of said compounds.

3. The method as claimed in claim 1, wherein the hydrophobic phase contains
   (a) 3-thiaalkan-1-ols, 3-thiaoxoalkan-1-ols, 3-thiadioxoalkan-1-ols, carboxylic esters of said compounds or mixtures thereof,
   (b1) polyglyceryl esters which are obtainable by at least 20% esterification of polyglycerols which have at least 2 glycerol units with at least one $C_{12}$- to $C_{36}$-fatty acid and
   (b2) glyceryl esters of fatty acids having at least 10 carbon atoms in the molecule, $C_{12}$- to $C_{30}$-alcohols, alkoxylated alcohols, esters of sugar alcohols having at least 4 OH groups or at least 2 OH groups and at least one intramolecular ether bond and of a fatty acid having at least 20 carbon atoms in the molecule, fatty esters of $C_{12}$- to $C_{22}$-carboxylic acids with monohydric to trihydric alcohols, ketones having melting points above 45° C., reaction products of mono- and diglycerides with dicarboxylic acids, reaction products of glycerol with dicarboxylic acids, which reaction products are esterified with at least one $C_{12}$- to $C_{36}$-fatty acid, polyethylene waxes, natural waxes, hydrocarbons having boiling points above 200° C., finely divided inert solids and mixtures of said compounds.

4. The method as claimed in claim 1, wherein the antifoam and/or deaerator contains nonionic, anionic, amphoteric and/or cationic emulsifiers as stabilizer.

5. The method as claimed in claim 1, wherein the antifoam and/or deaerator contains from 0.1 to 3% by weight of a water-soluble, amphiphilic copolymer having acid groups and/or of a water-soluble salt thereof as a stabilizer.

6. The method as claimed in claim 1, wherein the antifoam and/or deaerator additionally contains, as a stabilizer, from 0.1 to 3% by weight, based on the oil-in-water dispersions, of at least one
   polymer of monoethylenically unsaturated acids having molar masses of from 1500 to 300,000, graft copolymer of from 5 to 40 parts by weight of N-vinylformamide per 100 parts by weight of a polyalkylene glycol having a molar mass of from 500 to 10,000, zwitterionic polyalkylene polyamine, zwitterionic polyethyleneimine, zwitterionic polyetherpolyamine or zwitterionic crosslinked polyalkylenepolyamine.

7. The method as claimed in claim 1, wherein the antifoam and/or deaerator additionally contains, as a stabilizer, homopolymers of acrylic acid, homopolymers of methacrylic acid, copolymers of acrylic acid and methacrylic acid, copolymers of acrylic acid and maleic acid, copolymers of methacrylic acid and maleic acid, polyvinylsulfonic acid, polyacrylamido-2-methylpropane-sulfonic acid or their alkali metal and ammonium salts having molar masses of from 1500 to 300,000.

8. The method as claimed in claim 1, wherein the hydrophobic phase contains from 1 to 100% by weight of a 3thiaalkan-1-ol, of a 3-thiaoxoalkan-1-ol, of a 3-thiadioxoalkan-1-ol, of esters of said compounds with $C_1$- to $C_{30}$-carboxylic acids or of mixtures thereof.

9. The method as claimed in claim 1, wherein the hydrophobic phase contains from 5 to 75% by weight of a 3-thia-$C_{16}$ to $C_{30}$-alkan-1-ol, of a 3-thiaoxo-$C_{16}$ to $C_{30}$-alkan-1-ol, of a 3-thiadioxo-$C_{16}$- to $C_{30}$-alkan-1-ol, of esters of said compounds with $C_1$- to $C_{30}$-carboxylic acids or of mixtures thereof.

10. The method as claimed in claim 1, wherein the hydrophobic phase contains from 5 to 70% by weight of a 3-thia-$C_{18}$- to $C_{28}$-alkan-1-ol.

11. A method of controlling foam in an aqueous medium having a tendency to foam formation, comprising adding an oil-in-water dispersion to the aqueous medium in antifoam and/or deaerating amounts, wherein the oil-in-water dispersion contains, in the dispersed hydrophobic phase, at least one compound selected from the group consisting of a 3-thiaalkan-1-ol, a 3-thiaoxoalkan-1-ol, a 3-thiadioxoalkan-1-ol and esters of said compounds, and wherein the aqueous medium is a papermaking medium.

12. An oil-in-water dispersion which contains, in the dispersed hydrophobic phase, (a) at least one compound selected from the group consisting of a 3-thiaalkan-1-ol, a 3-thiaoxoalkan-1-ol, a 3-thiadioxoalkan-1-ol, and esters of said compounds, (b1) polyglyceryl esters which are obtainable by at least 20% esterification of polyglycerols which have at least 2 glycerol units with at least one $C_{12}$- to $C_{36}$-fatty acid and (b2) glyceryl esters of fatty acids having at least 10 carbon atoms in the molecule, $C_{12}$- to $C_{30}$-alcohols, alkoxylated alcohols esters of sugar alcohols having at least 4 OH groups or at least 2 OH groups and at least one intramolecular ether bond and of a fatty acid having at least 20 carbon atoms in the molecule fatty esters of $C_{12}$- to $C_{22}$-carboxylic acids with monohydric to trihydric alcohols ketones having melting points above 45° C. reaction products of mono- and diglycerides with dicarboxylic acids, reaction products of glycerol with dicarboxylic acids, which reaction products are esterified with at least one $C_{12}$- to $C_{36}$-fatty acid, polyethylene waxes, natural waxes, hydrocarbons having boiling points above 200° C., finely divided inert solids and mixtures of said compounds.

13. A method of controlling foam in an aqueous medium having a tendency to foam formation, comprising adding the oil-in-water dispersion as claimed in claim 12 to the aqueous medium in antifoam and/or deaerating amounts.

14. The method as claimed in claim 13, wherein the aqueous medium is a papermaking medium.

15. The method as claimed in claim 14, wherein the aqueous medium is at a temperature above 40° C.

16. An aqueous medium having a tendency to foam formation, comprising the oil-in-water dispersion as claimed in claim 12 contained therein in antifoam and/or deaerating amounts.

17. An antifoam and/or deaerator comprising an oil-in-water dispersion which contains, in the dispersed hydrophobic phase, at least one of each of the following (a), (b1) and (b2):

(a) 3-thiaalkan-1-ols, 3-thiaoxoalkan-1-ols, 3-thiadioxoalkan-1-ols, carboxylic esters of said compounds or mixtures thereof, (b1) polyglyceryl esters which are obtainable by at least 20% esterification of polyglycerols which have at least 2 glycerol units with at least one $C_{12}$- to $C_{36}$-fatty acid and (b2) glyceryl esters of fatty acids having at least 10 carbon atoms in the molecule, $C_2$- to $C_{30}$-alcohols, alkoxylated alcohols, esters of sugar alcohols having at least 4 OH groups or at least 2 OH groups and at least one intramolecular ether bond and of a fatty acid having at least 20 carbon atoms in the molecule, fatty esters of $C_{12}$- to $C_{22}$-carboxylic acids with monohydric to trihydric alcohols, ketones having melting points above 45° C., reaction products of mono- and diglycerides with dicarboxylic acids, reaction products of glycerol with dicarboxylic acids, which reaction products are esterified with at least one $C_{12}$- to $C_{36}$-fatty acid, polyethylene waxes, natural waxes, hydrocarbons having boiling points above 200° C., finely divided inert solids and mixtures of said compounds.

18. An antifoam and/or deaerator as claimed in claim 17, which contains nonionic, anionic, amphoteric and/or cationic emulsifiers as stabilizer.

19. An antifoam and/or deaerator as claimed in claim 17, which contains from 0.1 to 3% by weight of a water-soluble, amphiphilic copolymer having acid groups and/or of a water-soluble salt thereof as a stabilizer.

20. An antifoam and/or deaerator as claimed in claim 17, which additionally contains, as a stabilizer, from 0.1 to 3% by weight, based on the oil-in-water dispersions, of at least one polymer of monoethylenically unsaturated acids having molar masses of from 1500 to 300,000, graft copolymer of from 5 to 40 parts by weight of N-vinylformamide per 100 parts by weight of a polyalkylene glycol having a molar mass of from 500 to 10,000, zwitterionic polyalkylene polyamine, zwitterionic polyethyleneimine, zwitterionic polyetherpolyamine or zwitterionic crosslinked polyalkylenepolyamine.

21. An antifoam and/or deaerator as claimed in claim 17, which additionally contains, as a stabilizer, homopolymers of acrylic acid, homopolymers of methacrylic acid, copolymers of acrylic acid and methacrylic acid, copolymers of acrylic acid and maleic acid, copolymers of methacrylic acid and maleic acid, polyvinylsulfonic acid, polyacrylamido-2-methylpropane-sulfonic acid or their alkali metal and ammonium salts having molar masses of from 1500 to 300,000.

22. An antifoam and/or deaerator as claimed in claim 17, wherein the hydrophobic phase contains from 1 to 100% by weight of a 3-thiaalkan-1-ol, of a 3-thiaoxoalkan-1-ol, of a 3-thiadioxoalkan-1-ol, of esters of said compounds with $C_1$- to $C_{30}$-carboxylic acids or of mixtures thereof.

23. An antifoam and/or deaerator as claimed in claim 17, wherein the hydrophobic phase contains from 5 to 75% by weight of a 3-thia-$C_{16}$ to $C_{30}$-alkan-1-ol, of a 3-thiaoxo-$C_{16}$ to $C_{30}$-alkan-1-ol, of a 3-thiadioxo-$C_{16}$- to $C_{30}$-alkan-1-ol, of esters of said compounds with $C_1$- to $C_{30}$-carboxylic acids or of mixtures thereof.

24. An antifoam and/or deaerator as claimed in claim 17, wherein the hydrophobic phase contains from 5 to 70% by weight of a 3-thia-$C_{18}$- to $C_{28}$-alkan-1-ol.

* * * * *